United States Patent [19]

Murase et al.

[11] Patent Number: 6,008,619

[45] Date of Patent: Dec. 28, 1999

[54] MOTOR DRIVE APPARATUS AND MOTOR DRIVING METHOD CAPABLE OF SIMPLY REDUCING ROTATING SPEED IN PWM MODE

[75] Inventors: Makoto Murase; Kazunari Mizuguchi; Toshio Tsubota, all of Tokyo; Tatsuo Nishizawa, Nagano, all of Japan

[73] Assignee: NEC Corporation, Tokyo, Japan

[21] Appl. No.: 09/106,265

[22] Filed: Jun. 29, 1998

[30] Foreign Application Priority Data

Jun. 30, 1997 [JP] Japan ................................. 9-174302

[51] Int. Cl.[6] .................................................. H02P 5/28
[52] U.S. Cl. .......................... 318/811; 318/430; 318/432; 318/138; 318/245; 318/439; 318/139; 318/376; 318/379; 318/293; 318/294
[58] Field of Search ..................................... 318/430, 432, 318/138, 245, 439, 139, 811, 376, 379, 293, 294

[56] References Cited

U.S. PATENT DOCUMENTS 5,675,699   10/1997   Yamamoto et al. ................ 318/139 X
5,809,438    9/1998   Noro et al. ......................... 318/430 X
5,861,724    1/1999   Ackerson ................................ 318/376

FOREIGN PATENT DOCUMENTS 5-211780   8/1993   Japan .
5-84196   11/1993   Japan .

*Primary Examiner*—Karen Masih
*Attorney, Agent, or Firm*—Foley & Lardner

[57] ABSTRACT

A drive current and a regenerative current are alternately applied to a motor during a PWM (pulse width modulation) time period. The regenerative current is produced by an electromagnetic induction of an armature and flows in the opposite direction as the drive current. Therefore, a rotating speed of the motor is reduced, so that a speed-reduction following characteristic for the motor is improved. By varying the duty factor, the lengths of time during which the drive current and the regenerative current are flowing can be controlled. Thus, the speed of the motor can be controlled.

19 Claims, 11 Drawing Sheets

Fig. 3 PRIOR ART

|  | S1 | S2 | S3 | S4 |
|---|---|---|---|---|
| TIME PERIOD A | ON | OFF | OFF | ON |
| TIME PERIOD B | ON | OFF | OFF | OFF |
| TIME PERIOD C | OFF | ON | ON | OFF |
| TIME PERIOD D | OFF | OFF | ON | OFF |

Fig. 7

|  | SW1 | SW2 | SW3 | SW4 |
|---|---|---|---|---|
| TIME PERIOD A | ON | OFF | OFF | ON |
| TIME PERIOD B | ON | OFF | ON | OFF |
| TIME PERIOD C | OFF | ON | ON | OFF |
| TIME PERIOD D | ON | OFF | ON | OFF |

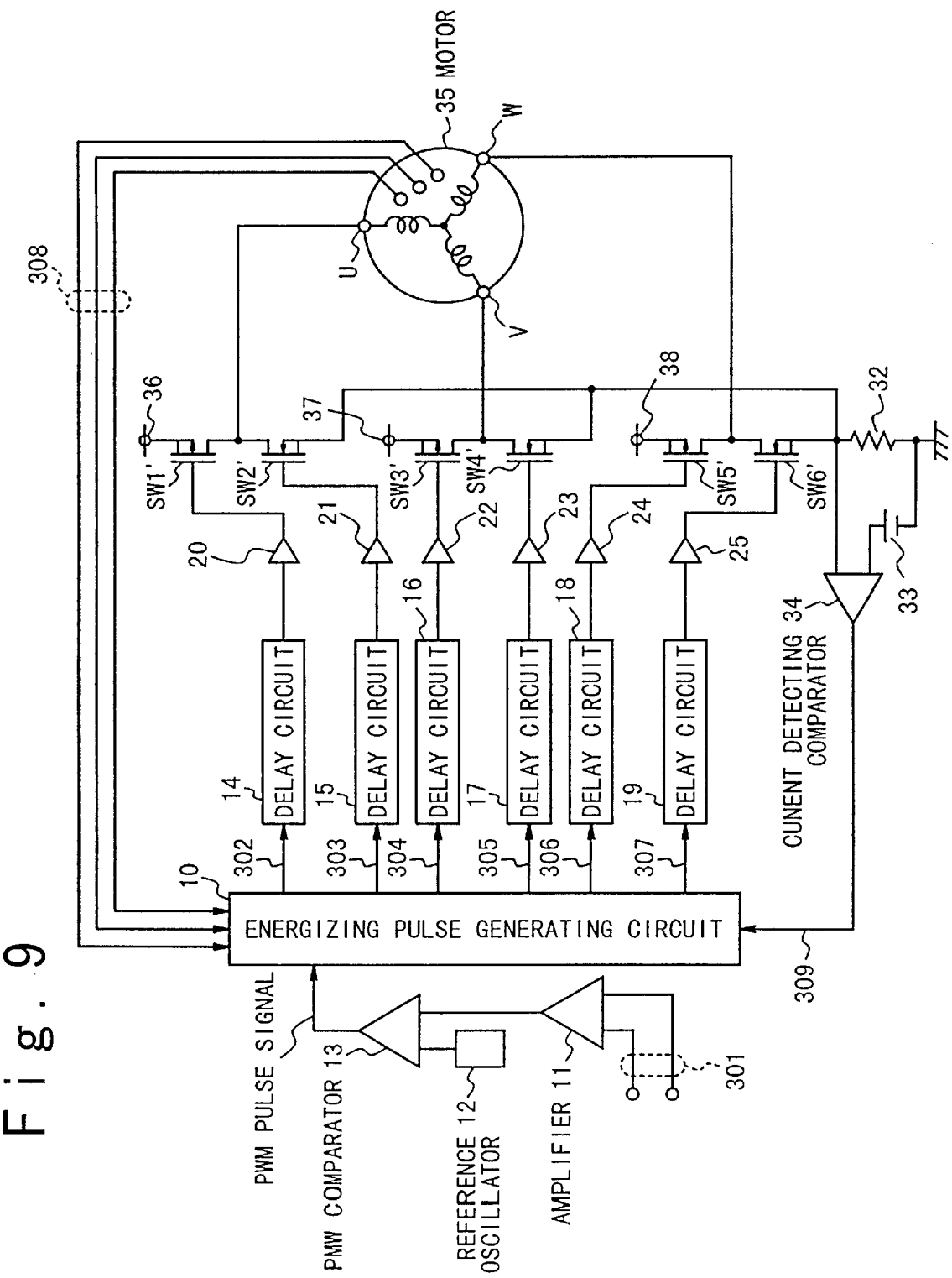

Fig. 11A
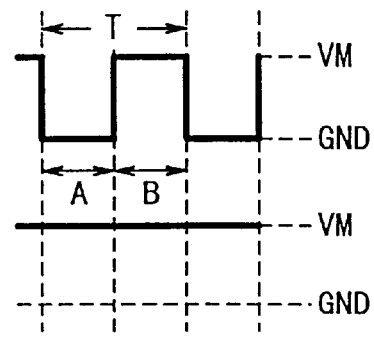
Fig. 11B
Fig. 12A
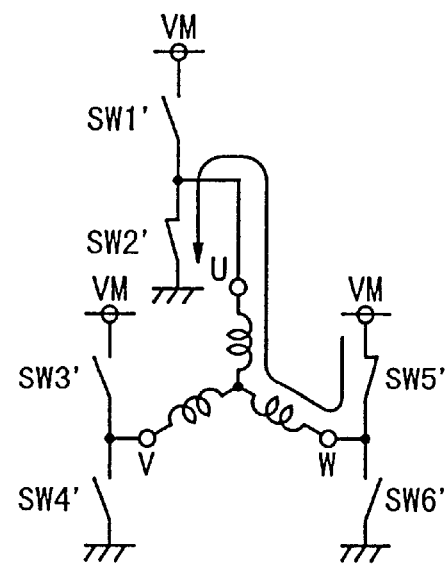
Fig. 12B
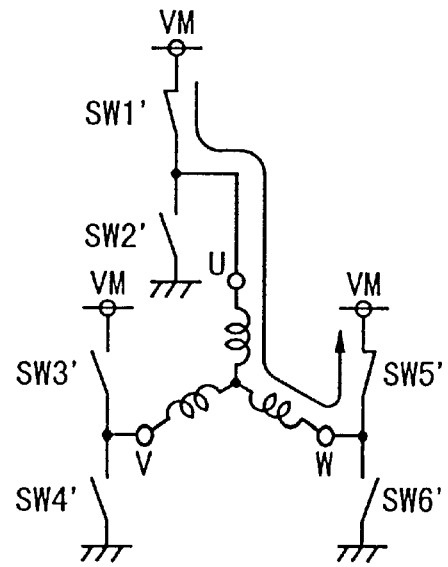

MOTOR DRIVE APPARATUS AND MOTOR DRIVING METHOD CAPABLE OF SIMPLY REDUCING ROTATING SPEED IN PWM MODE

BACKGROUND OF THE INVENTION

1. Field of the Invention

The present invention generally relates to a motor drive apparatus and a motor driving method. More specifically, the present invention is directed to a speed control technique capable of controlling rotating speeds of a spindle motor, a brushless motor, and the like.

2. Description of the Related Art

Conventionally, to rotate CD-ROMs (Compact Disk-ROMs) and DVDs (Digital Video Disks), for instance, 3-phase spindle motors are known in the field. To drive the 3-phase spindle motors, motor drive apparatuses with employment of PWM (Pulse Width Modulation) control systems are employed. In such a PWM control system, a rotating speed of a motor is controlled by using a pulse width modulated signal. A typical PWM type motor drive apparatus is indicated in FIG. 1. For the sake of a simple explanation, only a circuit arrangement corresponding to a single phase is shown in this drawing. As shown in FIG. 1, this motor drive apparatus is arranged by an energizing (exciting) pulse generating circuit 40, a motor 45, and switches S1, S2, S3 and S4.

The energizing pulse generating circuit 40 is arranged by a logic circuit. This energizing pulse generating circuit 40 generates PWM signals 501, 502, 503, and 504 used to control the rotating speed of the motor 45, and then supplies these PWM signals to the switches S1, S2, S3, and S4, respectively. Each of these PWM signals 501, 502, 503, and 504 is a pulse signal having a time period "T" (will be referred to as a "PWM time period T" hereinafter). A duty factor of each of these PWM signals is varied in response to a rotating speed to be controlled.

The motor 45 has a first input terminal 47 and a second input terminal 48. The rotating speed of this motor 45 is controlled by a first drive signal supplied to the first input terminal 47 and a second drive signal supplied to the second input terminal 48.

The switches S1, S2, S3, and S4 are turned ON when the PWM signals 501, 502, 503, 504 generated from the energizing pulse generating circuit 40 own high levels ("H" levels), and are turned OFF when these PWM signals 501, 502, 503, 504 own low levels ("L" levels).

As indicated in FIG. 1, one terminal of the switch S1 is connected to a VM terminal 46 to which the power supply voltage is applied, and the other terminal thereof is connected to the first input terminal 47 of the motor 45 and one terminal of the switch S2. The other terminal of the switch S2 is grounded. Also, one terminal of the switch S3 is connected to the VM terminal 46, and the other terminal thereof is connected to the second input terminal 48 of the motor 45 and also to one terminal of the switch S4. The other terminal of the switch S4 is grounded.

Operations of the motor drive apparatus with employment of the above-described circuit arrangement will now be described. FIG. 2A shows a waveform (potential level) of the first drive signal supplied to the first input terminal 47 of the motor 45, and FIG. 2B indicates a waveform (potential level) of the second drive signal supplied to the second input terminal 48 of the motor 45. The waveforms of the first drive signal and the second drive signal are determined by turning ON/OFF the switches S1, S2, S3, and S4. In FIG. 2A and FIG. 2B, symbol "T" indicates a PWM time period.

FIG. 3 represents ON/OFF states of the respective switches S1, S2, S3, and S4 in the respective time periods A, B, C, and D of the first drive signal shown in FIG. 2A and of the second drive signal shown in FIG. 2B. FIG. 4A to FIG. 4D indicate paths of motor drive currents flowing from the VM terminal 46 via the motor 45 to the ground point in the respective time periods A, B, C, and D.

When the motor 45 is driven, the energizing pulse generating circuit 40 is first initiated in response to a control signal (not shown) supplied from an external circuit. As a result, the energizing pulse generating circuit 40 outputs the PWM signals 501, 502, 503 and 504 so as to control the turning ON/OFF operations of the switches S1, S2, S3 and S4 every PWM time period in the below-mentioned control manner.

That is, in the time period A of a certain PWM time period, both the switch S1 and the switch S4 are turned ON, and both the switch S2 and the switch S3 are turned OFF. As a consequence, a motor drive current flows from the VM terminal 46 to the ground point via a path indicated by an arrow of FIG. 4A. Accordingly, the motor 45 is driven to thereby rotate along a preselected direction.

Also, in the time period B of this PWM time period, the switch S1 is turned ON, whereas the switch S2, the switch S3 and the switch S4 are turned OFF. As a result, as indicated in FIG. 4B, the current path directed from the VM terminal 46 to the ground point is interrupted, so that the potential at the second input terminal 48 is brought into a non-definition state. Therefore, since no current flows into the motor 45, the motor 45 is not driven. However, the motor 45 itself is continuously rotated due to inertia force.

Subsequently, since the PWM time period is repeated in a similar manner, the motor 45 is rotated along the above-described preselected direction. In this case, the longer the time duration during which the motor drive current flows through the motor 45 is prolonged, namely the longer the time period A in the respective PWM time periods is prolonged, the larger the force produced in the armature of this motor 45 is increased. As a result, the rotating speed of the motor 45 is increased.

When the motor 45 is rotated by a predetermined angle in this manner, since the phase is changed, the motor drive current flowing through the motor 45 must flow through a current path along a direction opposite to the above-described direction. For this purpose, in the time period C of the PWM time period after the phase has been changed, both the switch S1 and the switch S4 are turned OFF, and both the switch S2 and the switch S3 are turned ON. As a consequence, a motor drive current flows from the VM terminal 46 to the ground point via a path indicated by an arrow of FIG. 4C. Accordingly, the motor 45 is driven to thereby rotate along the above-described preselected direction.

Also, in the time period D of this PWM time period, the switch S3 is turned ON, whereas the switch S1, the switch S2 and the switch S4 are turned OFF. As a result, as indicated in FIG. 4D, the current path directed from the VM terminal 46 to the ground point is interrupted, so that the potential at the second input terminal 48 is brought into a non-definition state. Therefore, since no current flows into the motor 45, the motor 45 is not driven. However, the motor 45 itself is continuously rotated due to inertia force.

Subsequently, since the PWM time period is repeated in a similar manner, the motor 45 is rotated along the above-described preselected direction. In this case, similarly, the longer the time duration during which the motor drive current flows through the motor 45 is prolonged, namely the longer the time period C in the respective PWM time periods is prolonged, the larger the force produced in the armature of this motor 45 is increased. As a result, the rotating speed of the motor 45 is increased.

In the above-explained conventional motor drive apparatus, the rotating speed of the motor 45 is increased in the case that the duty factor of the PWM signal is changed so as to prolong the ON-time of the switches S1 and S4 in the time period A, and furthermore the duty factor of the PWM signal is varied in order to prolong the ON-time of the switches S2 and S3 in the time period C. As a result, the better acceleration following characteristic can be obtained.

However, in this conventional motor drive apparatus, there is a problem that the speed-reduction following characteristic cannot be obtained under better condition. In other words, to reduce the motor rotating speed, the energizing pulse generating circuit 40 changes the duty factor of the PWM signal in such a manner that the ON-time of the respective switches S1 and S4 in the time period A and the respective switch S2 and S3 in the time period C are shortened. However, in the rear half of the PWM time period (namely, time period B and time period D), all of the current paths for the motor drive currents flowing through the armature of the motor 45 are interrupted. As a result, the motor is continuously rotated due to inertia force without receiving any braking force. As a consequence, the speed-reduction following characteristic of the motor 45 is considerably deteriorated.

Also, for example, spindle motors of CD-ROM drives require very high speed-reduction following characteristics. To meet such a requirement, a speed reducing means for executing either short braking operation or reverse rotating operation may be provided in order to reduce the rotating speed of the motor continuously rotated due to the inertia force. However, there is another problem that when such a speed reducing means is separately provided, the complex rotation speed control sequence for the spindle motors is necessarily required.

The related art is disclosed in Japanese Patent Laid-open Disclosure (JP-A-Heisei 5-211780) filed in the priority basis of U.S. Pat. No. 5,309,078 entitled as "SYNCHRONOUS RECTIFICATION METHOD FOR REDUCING POWER DISSIPATION IN MOTOR DRIVERS IN PWM MODE". That is, this synchronous rectification method is related to Pulse Width Modulation (PWM) techniques, often used to reduce the power dissipation in polyphase motors, chop the current in the coils of the motor at their peak current levels, to achieve maximum torque, to allow rapid accelerations, and to reduce the power dissipated in the chip to a level proportional to the duty cycle. During the time the current is switched OFF, the current which has been established in the coils of the motor is allowed to be dissipated. Accordingly, when the switching transistors of the active coils are turned OFF during PWM mode chopping a non-rectifying ground return path is provided by switching transistors in driving coil. This non-rectifying ground return path is provided by switching transistors in parallel with flyback diodes, operated in a form of synchronous rectification. This gives an alternate current path for the coil current to reduce the voltage drop across the diodes, and thereby reduce the power dissipation and heat in the chip.

However, this synchronous rectification method described in JP-A-Heisei 5-211780 does not open the technique capable of highly improving the speed-reduction following characteristic.

SUMMARY OF THE INVENTION

The present invention has been made to solve the above-described problems, and therefore, has an object to provide a PWM control type motor drive apparatus and a PWM control type motor driving method, capable of simply and effectively reducing a rotating speed of a motor, while achieving a superior speed-reduction following characteristic.

Briefly, according to an aspect of the present invention, there is provided a motor drive apparatus for changing a duty factor of a PWM (pulse width modulation) time period to vary a rotating speed of a motor. The apparatus includes a switch unit and an energizing pulse generating unit. The switch unit includes a switch and the switch unit is for turning ON/OFF the switch to control a current flowing through the motor. The energizing pulse generating unit is for generating a PWM signal used to control the switch unit such that (i) a motor drive current flows from a power supply via the motor to a ground point in a preceding time period of the PWM time period, and (ii) a regenerative current flows along a direction opposite to that of the motor drive current in a succeeding time period of the PWM time period.

Briefly, according to another aspect of the present invention, there is provided a motor drive apparatus for changing a duty factor of a PWM (pulse width modulation) time period to vary a rotating speed of a motor, wherein the motor includes a 3-phase motor. The motor drive apparatus includes a switch unit and an energizing pulse generating unit. The switch unit includes a switch and the switch unit is for controlling a current flowing through the 3-phase motor by opening/closing the switch. The energizing pulse generating unit is for generating PWM signals used to control the switch unit such that the following power supplying operations are repeatedly carried out: (i) a power supplying operation from a third input terminal of the 3-phase motor to a first input terminal thereof; (ii) a power supplying operation from a second input terminal of the 3-phase motor to the first input terminal thereof; (iii) a power supplying operation from the second input terminal of the 3-phase motor to the third input terminal thereof; (iv) a power supplying operation from the first input terminal of the 3-phase motor to the third input terminal thereof; (v) a power supplying operation from the first input terminal of the 3-phase motor to the second input terminal thereof; and (vi) a power supplying operation from the third input terminal of the 3-phase motor to the second input terminal thereof. In a preceding time period of the PWM time period when each of the power supplying operations is performed, a drive current flows from a power supply via the 3-phase motor to a ground point, and in a succeeding time period of the PWM time period, a regenerative current flows along a direction opposite to that of the drive current.

Briefly, according to another aspect of the present invention, there is provided a motor driving method for changing a duty factor of a PWM (pulse width modulation) time period to vary a rotating speed of a motor. The method includes causing a drive current to flow and causing a regenerative current to flow. The drive current is caused to flow from a power supply via the motor to a ground point in a preceding time period of the PWM time period. The regenerative current is caused to flow along a direction opposite to that of the drive current in a succeeding time period of the PWM time period.

BRIEF DESCRIPTION OF THE DRAWINGS

For a better understanding of the present invention, reference is made of a detailed description to be read in conjunction with the accompanying drawings, in which:

FIG. 3 is a state diagram for representing ON/OFF states of the respective switches S1 to S4 in the respective time periods A to D in order to produce the first drive signal shown in FIG. 2A and the second drive signal shown in FIG. 2B;

FIG. 7 is a state diagram for indicating ON/OFF states of the respective switches SW1 to SW4 in the respective time periods A to D in order to produce the first drive signal shown in FIG. 6A and the second drive signal indicated in FIG. 6B;

FIG. 9 schematically shows a circuit arrangement of a motor drive apparatus according to a second embodiment of the present invention;

FIG. 11A indicates a waveform of a first drive signal which is supplied to a first input terminal U in a time period A and a time period B within one PWM time period T in the motor drive apparatus shown in FIG. 9;

FIG. 11B indicates a waveform of a third drive signal which is supplied to a third input terminal W in a time period A and the time period B within one PWM time period T in the motor drive apparatus shown in FIG. 9;

FIG. 12A shows path of a motor drive current in the time period A shown in FIG. 11A; and FIG. 12B shows path of a motor drive current in the time period B shown in FIG. 11B.

DESCRIPTION OF THE PREFERRED EMBODIMENTS

Referring now to drawings, a motor drive apparatus according to a preferred embodiment of the present invention will be described.

FIRST EMBODIMENT

It should be noted that a circuit arrangement of a motor drive apparatus according to a first preferred embodiment of the present invention is substantially the same as that of the above-described conventional motor drive apparatus. However, this motor drive apparatus of the first embodiment owns such a particular different technical point, namely a characteristic of a PWM signal outputted from an energizing (exciting) pulse generating circuit 1 according to this first embodiment.

Figure 1:
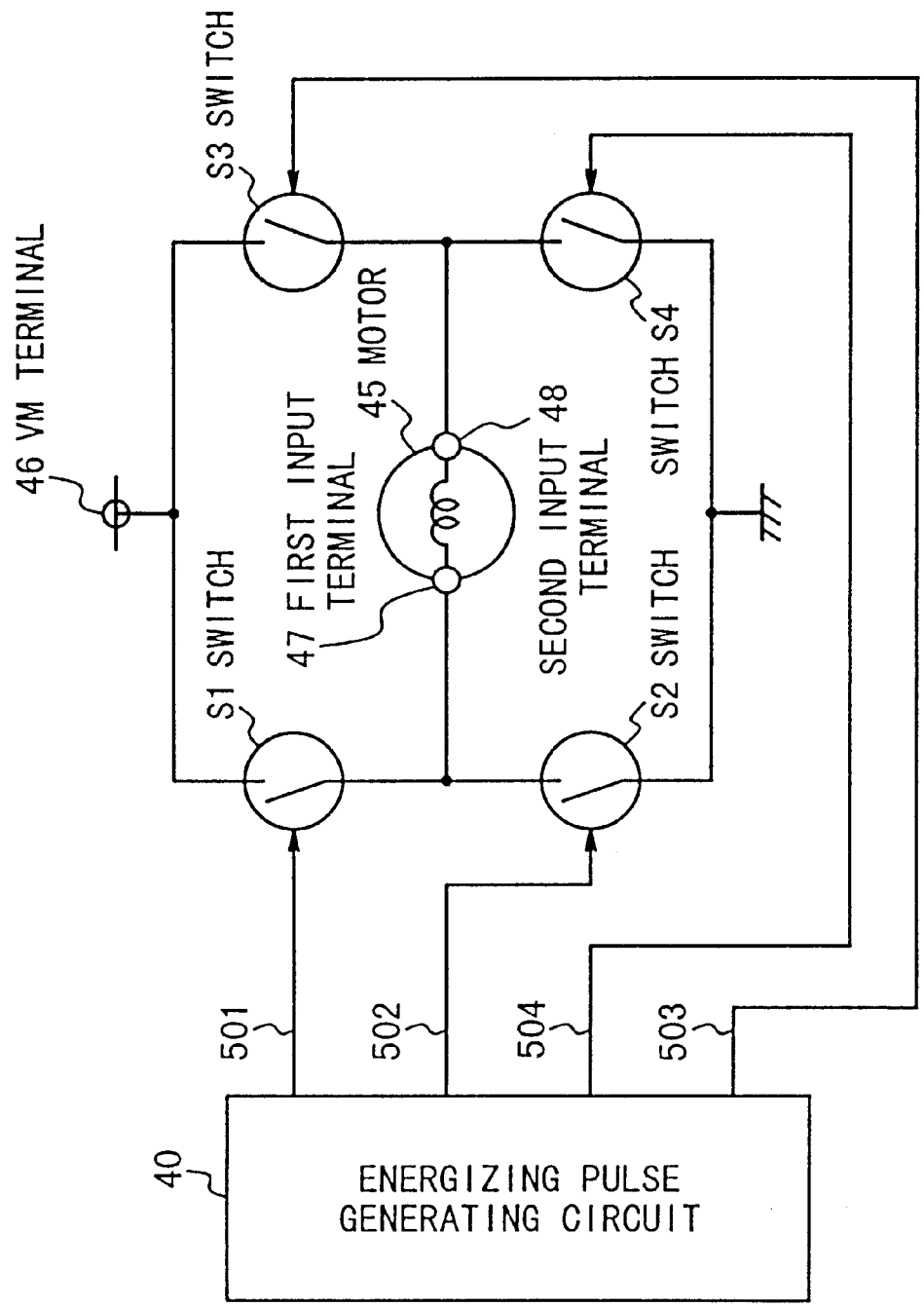
FIG. 1 schematically indicates one example of the conventional motor drive apparatus.
Figures 2A, 2B:
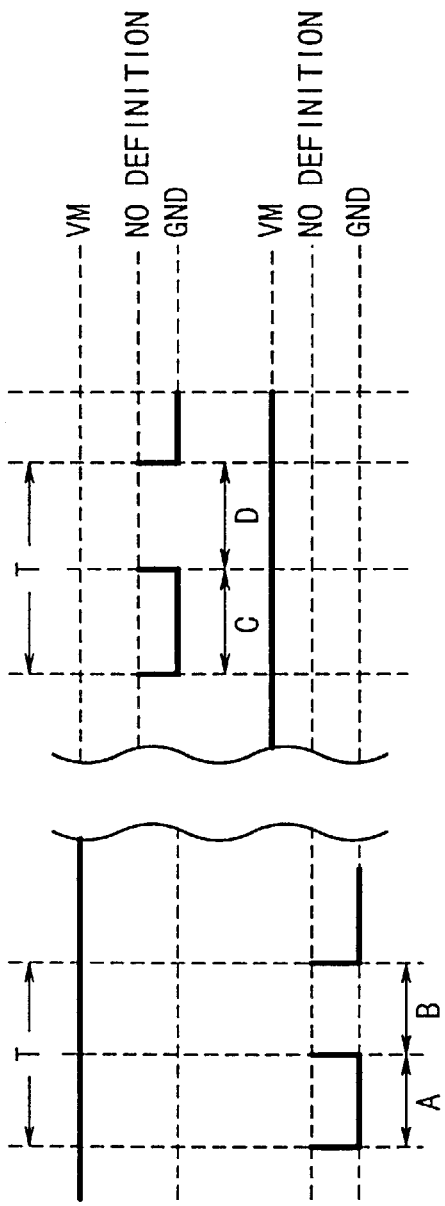
FIG. 2A represents a waveform of the first drive signal outputted from the motor drive apparatus shown in FIG. 1.
FIG. 2B represents a waveform of the second drive signal outputted from the motor drive apparatus shown in FIG. 1.
Figure 4A:
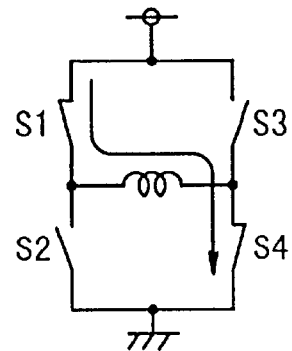
FIG. 4A illustrates the path of the motor drive current flowing in the time period A shown in FIG. 3.
Figure 4B:
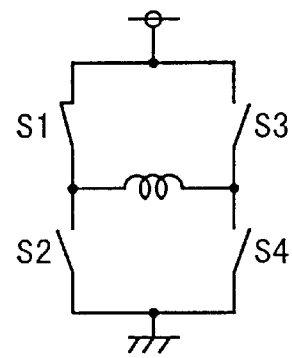
FIG. 4B illustrates the path of the motor drive current flowing in the time period B shown in FIG. 3.
Figure 4C:
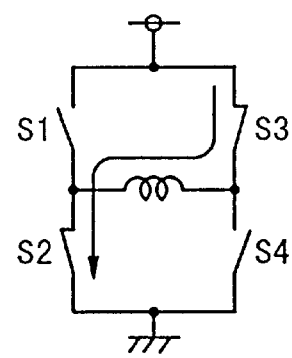
FIG. 4C illustrates the path of the motor drive current flowing in the time period C shown in FIG. 3.
Figure 4D:
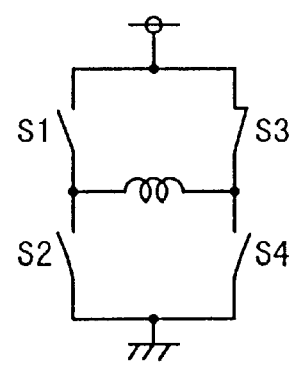
FIG. 4D illustrates the path of the motor drive current flowing in the time period D shown in FIG. 3.
Figure 5:
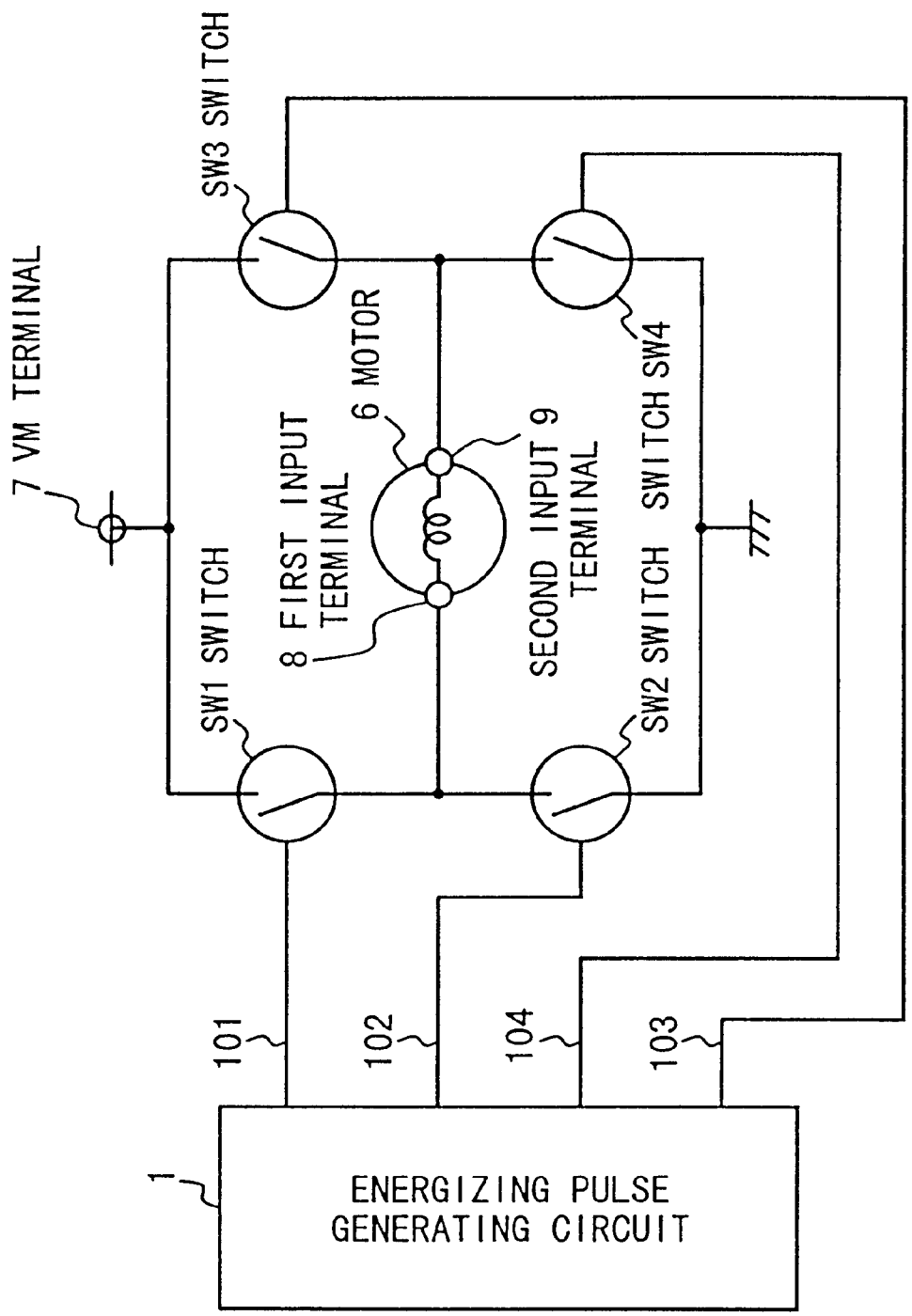
FIG. 5 schematically shows a circuit arrangement of a motor drive apparatus according to a first embodiment of the present invention.

FIG. 5 schematically shows a circuit arrangement of a motor drive apparatus according to the first preferred embodiment of the present invention. Also, in this FIG. 5, for the sake of a simple explanation, only a circuit arrangement corresponding to a single phase is shown in this drawing. As shown in FIG. 5, this motor drive apparatus of the first embodiment is arranged by an energizing pulse generating circuit 1, a motor 6, and switches SW1, SW2, SW3 and SW4.

The energizing pulse generating circuit 1 is arranged by a logic circuit. This energizing pulse generating circuit 1 generates PWM (pulse width modulation) control signals 101, 102, 103, and 104 used to control the rotating speed of the motor 6, and then supplies these PWM signals to the switches SW1, SW2, SW3, and SW4, respectively. Each of these PWM signals 101, 102, 103, and 104 is a pulse signal having a "PWM time period T". A duty factor, or a duty ratio of each of these PWM signals is varied in response to a rotating speed to be controlled.

The motor 6 has a first input terminal 8 and a second input terminal 9. The rotating speed of this motor 6 is controlled by a first drive signal supplied to the first input terminal 8 and a second drive signal supplied to the second input terminal 9.

These switches SW1, SW2, SW3 and SW4 are arranged by, for example, a MOS transistor, or a bipolar transistor. The switches SW1, SW2, SW3, and SW4 are turned ON when the PWM signals 101, 102, 103, 104 generated from the energizing pulse generating circuit 1 own high levels ("H" levels), and are turned OFF when these PWM signals 101, 102, 103, 104 own low levels ("L" levels).

As indicated in FIG. 5, one terminal of the switch SW1 is connected to a VM terminal 7 to which the power supply voltage is applied, and the other terminal thereof is connected to the first input terminal 8 of the motor 6 and one terminal of the switch SW2. The other terminal of the switch SW2 is grounded. Also, one terminal of the switch SW3 is connected to the VM terminal 7, and the other terminal thereof is connected to the second input terminal 9 of the motor 6 and also to one terminal of the switch SW4. The other terminal of the switch SW4 is grounded.

Figure 6:
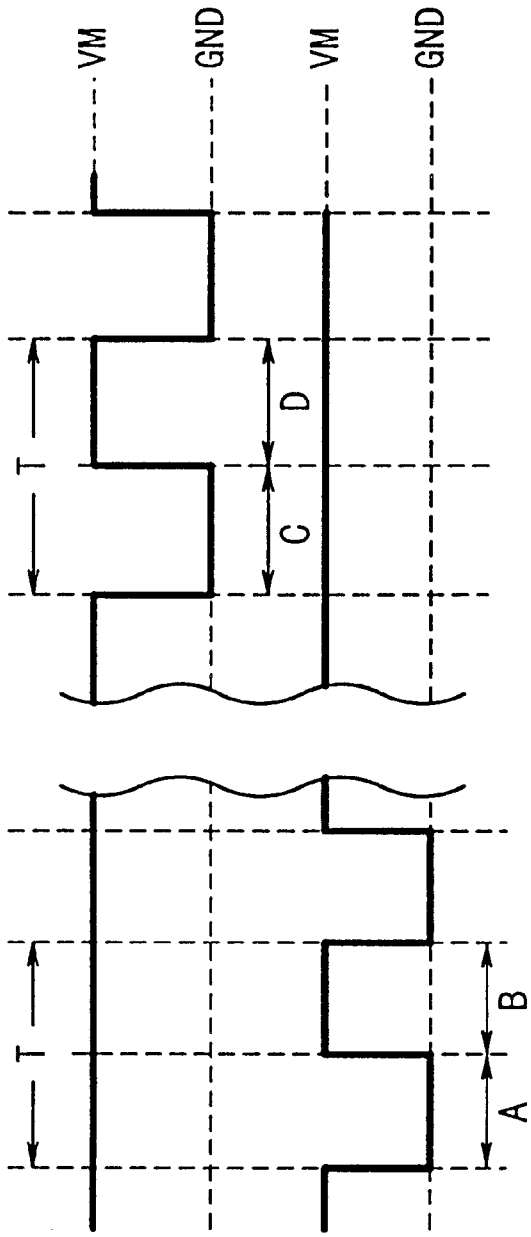
FIG. 6A represents a waveform of a first drive signal outputted from the motor drive apparatus shown in FIG. 5.
FIG. 6B indicates a waveform of a second drive signal outputted from the motor drive apparatus shown in FIG. 5.

Operations of the motor drive apparatus with employment of the above-described circuit arrangement will now be described. FIG. 6A shows a waveform (potential level) of the first drive signal supplied to the first input terminal 8 of the motor 6, and FIG. 6B indicates a waveform (potential level) of the second drive signal supplied to the second input terminal 9 of the motor 6. The waveforms of the first drive signal and the second drive signal are determined by turning ON/OFF the switches SW1, SW2, SW3, and SW4. In FIG. 6A and FIG. 6B, symbol "T" indicates a PWM time period.

FIG. 7 represents ON/OFF states of the respective switches SW1, SW2, SW3, and SW4 in the respective time periods A, B, C, and D of the first drive signal shown in FIG. 6A and of the second drive signal shown in FIG. 6B. FIG.

Figure 8A:
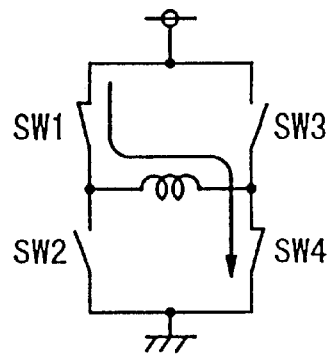
FIG. 8A illustrates path of motor drive current flowing in the time period A indicated in FIG. 7.
Figure 8B:
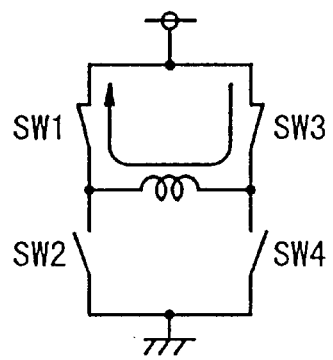
FIG. 8B illustrates path of motor drive current flowing in the time period B indicated in FIG. 7.
Figure 8C:
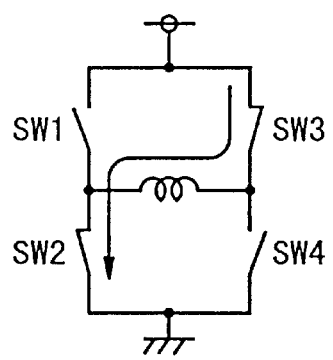
FIG. 8C illustrates path of motor drive current flowing in the time period C indicated in FIG. 7.
Figure 8D:
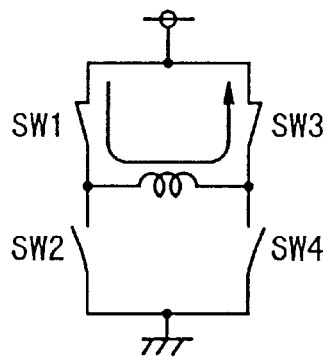
FIG. 8D illustrates path of motor drive current flowing in the time period D indicated in FIG. 7.

8A to FIG. 8D indicate paths of the motor drive currents flowing from the VM terminal 7 via the motor 6 to the ground point in the respective time periods A, B, C, and D.

When the motor 6 is driven, the energizing pulse generating circuit 1 is first initiated in response to a control signal (not shown) supplied from an external circuit. As a result, the energizing pulse generating circuit 1 outputs the PWM signals 101, 102, 103 and 104 so as to control the turning ON/OFF operations of the switches SW1, SW2, SW3 and SW4 every PWM time period in the below-mentioned control manner.

That is, in the time period A of a certain PWM time period, both the switch SW1 and the switch SW4 are turned ON, and both the switch SW2 and the switch SW3 are turned OFF. As a consequence, a motor drive current flows from the VM terminal 7 to the ground point via a path indicated by an arrow of FIG. 8A. Accordingly, the motor 6 is driven to thereby rotate along a preselected direction.

Also, in the time period B of this PWM time period, the switch SW1 and the switch SW3 are turned ON, whereas the switch SW2 and the switch SW4 are turned OFF. As a result, as indicated in FIG. 8B, the current path directed from the VM terminal 7 to the ground point is interrupted. However, as indicated by an arrow of FIG. 8B, a regenerative current is produced from the second input terminal 9 to the first input terminal 8, because of electromagnetic induction exerted from the motor 6 which is rotated by inertia force. Since this regenerative current is produced, the rotary energy of the motor 6 is converted into heat. As a consequence, a heat loss occurs and the rotary energy is reduced, so that the rotating speed of the motor 6 can be reduced.

Subsequently, since the PWM time period is repeated in a similar manner, the motor 6 is rotated along the above-described preselected direction. In this case, the longer the time duration during which the motor drive current flows through the motor 6 is prolonged, namely the longer the time period A in the respective PWM time periods is prolonged, the larger the force produced in the armature of this motor 6 is increased. As a result, the rotating speed of the motor 6 is increased. On the other hand, the shorter the time duration during which the motor drive current flows through the motor 6 is shortened, namely the longer the time period B in the respective PWM time periods is prolonged, the consumption of the rotary energy caused by the regenerative current flowing through this motor 6 is increased, and the rotating speed of the motor 6 is lowered. As a result, in accordance with the motor drive apparatus of this first embodiment, while the acceleration following characteristic of the motor 6 can be maintained under better condition, the speed-reduction following characteristic of this motor 6 can be improved.

When the motor 6 is rotated by a predetermined angle in this manner, since the phase is changed, the motor drive current flowing through the motor 6 must flow through a current path along a direction opposite to the above-described direction. For this purpose, in the time period C of the PWM time period after the phase has been changed, both the switch SW1 and the switch SW4 are turned OFF, and both the switch SW2 and the switch SW3 are turned ON. As a consequence, a motor drive current flows from the VM terminal 7 to the ground point via a path indicated by an arrow of FIG. 8C. Accordingly, the motor 6 is driven to thereby rotate along the above-described preselected direction.

Also, in the time period D of this PWM time period, the switch SW1 and the switch SW3 are turned ON, whereas the switch SW2 and the switch SW4 are turned OFF. As a result, as indicated in FIG. 8D, the current path directed from the VM terminal 7 to the ground point is interrupted. However, as indicated by an arrow of FIG. 8D, a regenerative current is produced from the first input terminal 8 to the second input terminal 9, because of electromagnetic induction exerted from the motor 6 which is rotated by inertia force. Since this regenerative current is produced, the rotary energy of the motor 6 is converted into heat. As a consequence, a heat loss occurs and the rotary energy is reduced, so that the rotating speed of the motor can be reduced.

Subsequently, since the PWM time period is repeated in a similar manner, the motor 6 is rotated along the above-described preselected direction. Also, in this case, due to a similar reason, while the acceleration following characteristic of the motor 6 can be maintained under better condition, the speed-reduction following characteristic can be improved.

SECOND EMBODIMENT

A description will now be made of a motor drive apparatus according to a second preferred embodiment of the present invention. In this second embodiment, a description is made of a perfect circuit arrangement used to control operations of a 3-phase spindle motor.

FIG. 9 schematically indicates a circuit arrangement of a motor drive apparatus according to the second embodiment of the present invention. This motor drive apparatus of the second embodiment is arranged by an energizing pulse generating circuit 10, an amplifier 11, a reference oscillator 12, a PWM comparator 13, delay circuits 14, 15, 16, 17, 18, 19, and drive buffer amplifiers 20, 21, 22, 23, 24, 25. The motor drive apparatus of the second embodiment is furthermore arranged by switches SW1', SW2', SW3', SW4', SW5', SW6', a resister 32, a reference power supply 33, a current detecting comparator 34, and a motor 35.

This motor 35 is constructed of a 3-phase motor having a first input terminal U, a second input terminal V, and a third input terminal W. This 3-phase motor 35 detects a rotation position of an armature, and then supplies the detected rotation position as a position sensing signal 308 to the energizing pulse generating circuit 10.

The energizing (exciting) pulse generating circuit 10 is constituted by a logic circuit (not shown in detail). The energizing pulse generating circuit 10 enters thereinto a PWM (pulse width modulation) pulse signal derived from the PWM comparator 13, the position sensing signal 308 derived from the motor 35, and also a rotation control stop signal 309 derived from the current detecting comparator 34. Then, the energizing pulse generating circuit 10 produces PWM signals 302, 303, 304, 305, 306 and 307 used to control the rotating speed of the motor 35 in response to these signals, and supplies these PWM signals to the delay circuits 14, 15, 16, 17, 18, and 19.

The delay circuits 14 to 19 delay the respective PWM signals 302 to 307 with proper delay times. It is possible to prevent an occurrence of a feed-through current, which is caused by that both the switch SW1' and the switch SW2' are simultaneously turned ON, both the switch SW3' and the switch SW4' are simultaneously turned ON, or both the switch SW5' and the switch SW6' are turned ON at the same time. The delayed PWM signals from the delay circuits 14 to 19 are supplied to the respective drive buffer amplifiers 20 to 25.

The drive buffer amplifiers 20 to 25 amplify the PWM signals delayed by the delay circuits 14 to 19 to obtain such PWM signals capable of sufficiently driving the switches SW1' to SW6'. The PWM signals amplified by these drive buffer amplifiers 20 to 25 are supplied to the switches SW1' to SW6' respectively.

The ON/OFF operations of the switches SW1' to SW6' are controlled in response to the PWM signals supplied from the drive buffer amplifiers 20 to 25. The switches SW1', SW3', and SW5' are arranged by PMOS transistors, whereas the switches SW2', SW4', and SW6' are arranged by NMOS transistors. As a result, the switches SW1', SW3', and SW5' are turned ON when the PWM signals derived from amplifiers 20, 22, and 24 own L levels, and are turned OFF when these PWM signals own H levels. Also, the switches SW2', SW4', and SW6' are turned ON when the PWM signals derived from amplifiers 21, 23, and 25 own H levels, and are turned OFF when these PWM signals own L levels.

A source of the PMOS transistor for constituting the switch SW1' is connected to a VM terminal 36 to which the power supply voltage is applied, a gate thereof is connected to the drive buffer amplifier 20, and a drain thereof is connected to a drain of the NMOS transistor for constituting the switch SW2' and also the first input terminal U of the motor 35. A gate of the NMOS transistor for constituting this switch SW2' is connected to the drive buffer amplifier 21, and a source thereof is connected via the resistor 32 to the earth.

A source of the PMOS transistor for constituting the switch SW3' is connected to the VM terminal, a gate thereof is connected to the drive buffer amplifier 22, and a drain thereof is connected to a drain of the NMOS transistor for constituting the switch SW4' and also the second input terminal V of the motor 35. A gate of the NMOS transistor for constituting this switch SW4' is connected to the drive buffer amplifier 23, and a source thereof is connected via the resistor 32 to the earth.

A source of the PMOS transistor for constituting the switch SW5' is connected to the VM terminal, a gate thereof is connected to the drive buffer amplifier 24, and a drain thereof is connected to a drain of the NMOS transistor for constituting the switch SW6' and also the third input terminal W of the motor 35. A gate of the NMOS transistor for constituting this switch SW6' is connected to the drive buffer amplifier 25, and a source thereof is connected via the resistor 32 to the earth.

The resistor 32, the reference power supply 33, and the current detecting comparator 34 constitute a safety switch. That is, the resistor 32 detects a current, which will flow into the ground point via the PMOS transistors and the NMOS transistors, which constitute the above respective switches SW1' to SW6'. The voltage obtained from this resistor 32 is applied to one input terminal of the current detecting comparator 34. The reference power supply 33 generates a reference voltage, and applies this reference voltage to the other input terminal of the current detecting comparator 34. The current detecting comparator 34 compares the voltage obtained from the resistor 32 with the reference voltage, and then supplies a signal representative of a comparison result as the rotation control stop signal 309 to the energizing pulse generating circuit 10. As a result, when an excessively large current will flow through each of the MOS transistors, the energizing pulse generating circuit 10 stops the supply of the PWM signals 302 to 307.

The amplifier 11 amplifies an externally supplied differential signal 301. This amplified differential signal is supplied to one input terminal of the PWM comparator 13. The reference oscillator 12 oscillates a reference signal, which is supplied to the other input terminal of the PWM comparator 13. The PWM comparator 13 compares the differential signal 301 amplified by the amplifier 11 with the reference signal oscillated from the reference oscillator 12, and outputs a signal indicative of a comparison result as a PWM pulse signal. This PWM pulse signal is supplied to the energizing pulse generating circuit 10.

Now, a description will be made of operations of the above-described motor drive apparatus of the second embodiment with employment of the above-explained circuit arrangement. In FIG. 9, when driving of the motor 35 is controlled, the differential signal 301 is externally supplied. The amplifier 11 amplifies this differential signal 301 in order that the signal level of the differential signal 301 becomes a preselected level. Then, the amplified differential signal 301 is supplied to one input terminal of the PWM comparator 13. The PWM comparator 13 compares the level of the reference signal issued from the reference oscillator 12 with the level of the differential signal 301 amplified by the amplifier 11. As a result of this comparison, a PWM pulse signal having a duty factor corresponding to the differential signal is produced, and then is supplied to the energizing pulse generating circuit 10.

The energizing pulse generating circuit 10 enters thereinto this PWM pulse signal to produce PWM signals 302, 303, 304, 305, 306 and 307 having duty factors corresponding to the above-described differential signal. Then, this energizing pulse generating circuit 10 supplies these PWM signals 302, 303, 304, 305, 306, 307 to the corresponding delay circuits 14, 15, 16, 17, 18, and 19 respectively. Then, these PWM signals 302 to 307 are delayed by the delay circuits 14 to 19, and the delayed PWM signals 302 to 307 are supplied via the corresponding drive buffer amplifiers 20 to 25 to the switches SW1' to SW6' (namely, gates of the respective MOS transistors).

Assuming now that a motor drive current flows between the first input terminal U and the second input terminal V, a drive control sequence of the motor 35 is performed as follows. That is to say, in such a case that a motor drive current is produced while directing from the first input terminal U to the second input terminal V, both the switch SW1' and the switch SW4' are turned ON whereas both the switch SW2' and the switch SW3' are turned OFF. Also, in the case that a regenerative current directed from the second input terminal V to the first input terminal U is produced to thereby reduce the rotating speed of the motor 35, the switching state of the switch SW3' is changed into the ON state, and also the switching state of the switch SW4' is changed into the OFF state.

In such a case that a motor drive current is produced while directing from the second input terminal V to the first input terminal U, both the switch SW2' and the switch SW3' are turned ON whereas both the switch SW1' and the switch SW4' are turned OFF. Also, in the case that a regenerative current directed from the second input terminal V to the first input terminal U is produced to thereby reduce the rotating speed of the motor 35, the switching state of the switch SW1' is changed into the ON state, and also the switching state of the switch SW2' is changed into the OFF state.

When a motor drive current flows between the second input terminal V and the third input terminal W, and further when a motor drive current flows between the third input terminal W and the first input terminal U, the ON/OFF operations of the respective switches SW1' to SW6' are controlled in a similar manner to the above-explained manner.

Figures 10A, 10B, 10C:
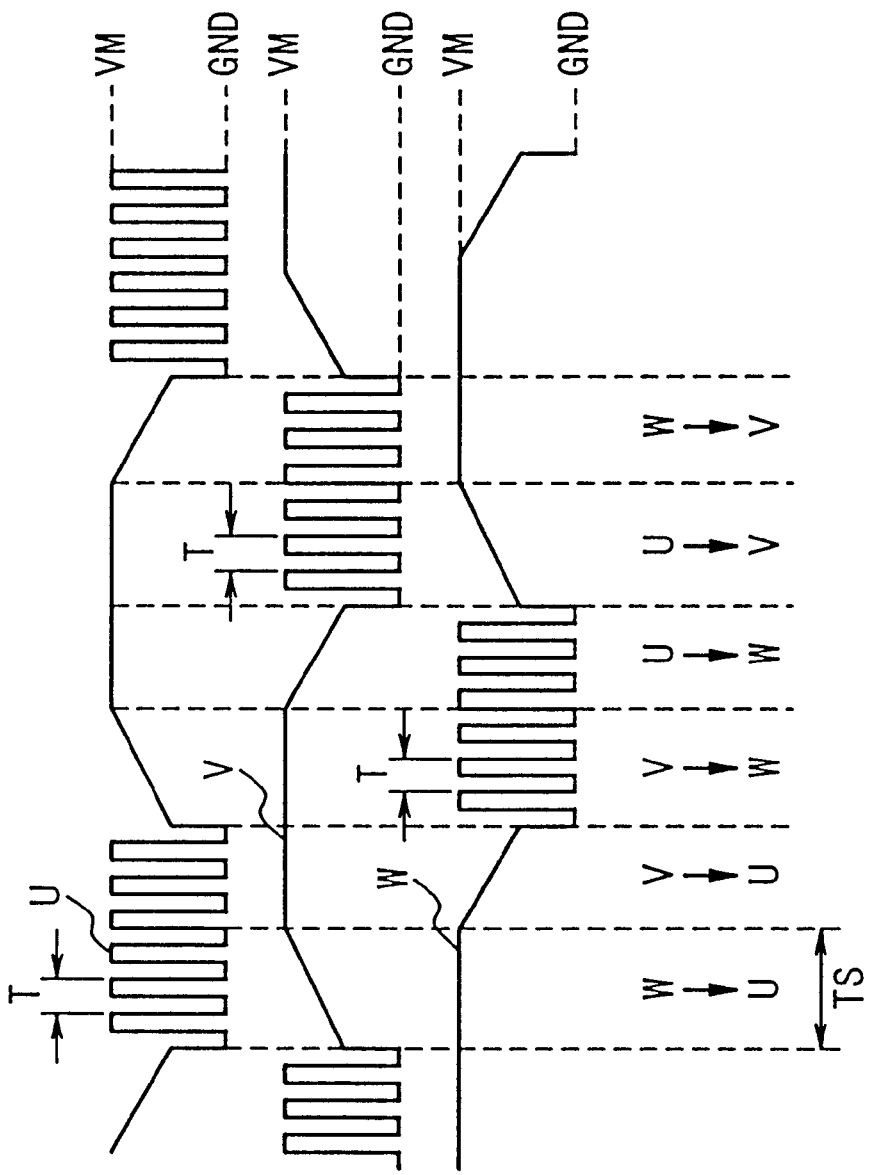
FIG. 10A represents a waveform of a first drive signal outputted from the motor drive apparatus shown in FIG. 9.
FIG. 10B indicates a waveform of a second drive signal outputted from the motor drive apparatus shown in FIG. 9.
FIG. 10C represents a waveform of a third drive signal outputted from the motor drive apparatus shown in FIG. 9.

In FIG. 10A to FIG. 10C, there are shown waveforms (potential levels) of drive signals which are supplied to the respective input terminals U, V, and W of the motor 35 when the motor drive current and the regenerative current are flowed between the arbitrary two input terminals selected from the input terminals U, V and W so as to control the rotating speed of the motor 35. That is, FIG. 10A shows a waveform of a first drive signal supplied to the first input terminal U of the motor 35. FIG. 10B represents a waveform of a second drive signal supplied to the second input terminal V. FIG. 10C indicates a waveform of a third drive signal supplied to the third input terminal W.

In FIG. 10A to FIG. 10C, symbol "TS" indicates a section in which the motor drive current is supplied from the third input terminal W to the first input terminal U, which is denoted as a power supply direction of "W" to "U". Similarly, other power supply directions of "V to U", "V to W", "U to W", "U to V" and "W to V" own similar implications. In this motor drive apparatus of the second embodiment, the drive signals are repeatedly supplied to the motor 35 so as to achieve these 6 sorts of power supply directions.

FIG. 11A and FIG. 11B partially show detailed waveforms (potential levels) of the first and third drive signals within the above-explained section TS. More detailed, FIG. 11A represents the detailed waveform of the first drive signal supplied to the first input terminal U in the time period A and the time period B within the PWM time period T. Similarly, FIG. 11B represents the detailed waveform of the third drive signal supplied to the third input terminal W in the time period A and the time period B within the PWM time period T.

Furthermore, FIG. 12A shows a path of a motor drive current flowing from a VM terminal via the motor 35 to the ground point in the time periods A. Also, FIG. 12B shows a path of a motor drive current flowing from a VM terminal via the motor 35 to another VM terminal in the time periods B.

In such a case that the motor 35 is driven, the energizing pulse generating circuit 10 is first initiated in response to the externally supplied differential signal 301. As a result, the energizing pulse generating circuit 10 generates the PWM signals 301, 302, 303, 304, 305 and 306 so as to control the ON/OFF operations of the switches SW1', SW2', SW3', SW4', SW5', and SW6' every PWM time period T, as will be explained as follows.

For instance, in the case of the power supply direction "W to U", i.e., from the third input terminal W to the first input terminal U, as shown in FIG. 12A, in the time period A of a certain PWM time period T, both the switch SW2' and the switch SW5' are turned ON, whereas the switch SW1', the switch SW3', the switch SW4', and the switch SW6' are turned OFF. As a consequence, a motor drive current may flow from the VM terminal to the ground point via the current path as indicated by an arrow of FIG. 12A within the motor 35. As a result, the motor 35 is driven to thereby rotate along a preselected direction.

Also, in the time period B of this PWM time period, as indicated in FIG. 12B, both the switch SW1' and the switch SW5' are turned ON, whereas the switch SW2', the switch SW3', the switch SW4', and the switch SW6' are turned OFF. As a consequence, similar to the operation of the first embodiment, a regenerative current flows between the VM terminals along another current path indicated by an arrow in FIG. 12B within the motor 35, so that the rotating speed of the motor 35 is reduced.

As explained above, the rotation control with respect to the power supply direction of "W to U" is first carried out. Under this rotation control, the acceleration is performed by the motor drive current and the speed-reduction is carried out by the regenerative current every PWM time period T, so that the stable rotating speed can be achieved. Subsequently, the rotation control operations are sequentially carried out with respect to the respective power supply directions of "W to U", "V to W", "U to W", "U to V", and "W to V". As a consequence, while the stable rotating speeds can be maintained in response to the duty factors, the motor drive apparatus for the 3-phase spindle motor, having the improved speed-reduction following characteristic, can be provided.

As previously described, in accordance with the present invention, since the rotation control operation is repeatedly carried out in such a way that the rotating speed of the motor is accelerated and reduced within each of PWM time periods, it is possible to realize such a motor drive apparatus with the superior speed-reduction following characteristic, and capable of maintaining the stable rotating speed in response to the duty factor of the PWM signal.

Also, when the motor drive apparatus according to the present invention is applied to a CD-ROM drive which requires rotating speed controls of a motor, the rotating speed of this motor can be controlled by not employing the extra speed reducing means, but by merely changing the duty factor of the PWM signal. As a consequence, the rotating speed can be very easily controlled.

What is claimed is:

1. A motor drive apparatus for changing a duty factor of a PWM (pulse width modulation) time period to vary a rotating speed of a motor, comprising:
    a switch unit including a switch, for turning ON/OFF the switch to control a current flowing through said motor; and
    an energizing pulse generating unit for generating a PWM signal used to control said switch unit such that a motor drive current flows from a power supply via said motor to a ground point in a preceding time period of said PWM time period, and a regenerative current flows along a direction opposite to that of said motor drive current in a succeeding time period of said PWM time period.

2. A motor drive apparatus according to claim 1, wherein said switch unit includes:
    a first switch, one terminal of which is connected to the power supply, and the other terminal of which is connected to a first input terminal of said motor;
    a second switch, one terminal of which is connected to said first input terminal of the motor, and the other terminal of which is grounded;
    a third switch, one terminal of which is connected to said power supply, and the other terminal of which is connected to a second input terminal of said motor; and
    a fourth switch, one terminal of which is connected to said second input terminal of the motor, and the other terminal of which is grounded.

3. A motor drive apparatus according to claim 2, wherein said energizing pulse generating unit generates PWM signals used to:
    turn ON said first switch;
    turn OFF said second switch;
    turn OFF said third switch; and
    turn ON said fourth switch in said preceding time period of said PWM time period; whereas said energizing pulse generating unit generates PWM signals used to:
turn ON said first switch;
turn OFF said second switch;
turn ON said third switch; and
turn OFF said fourth switch in said succeeding time period of said PWM time period.

4. A motor drive apparatus according to claim 3, wherein
each of said first switch, said second switch, said third switch, and said fourth switch includes an MOS transistor; and
said PWM signals generated from said energizing pulse generating unit are supplied to gates of the respective MOS transistors to control the turning ON/OFF of said first switch, said second switch, said third switch, and said fourth switch.

5. A motor drive apparatus according to claim 2, wherein
said energizing pulse generating unit generates PWM signals used to:
turn OFF said first switch;
turn ON said second switch;
turn ON said third switch; and
turn OFF said fourth switch in said preceding time period of said PWM time period; whereas
said energizing pulse generating unit generates PWM signals used to:
turn ON said firs switch;
turn OFF said second switch;
turn ON said third switch; and
turn OFF said fourth switch in said succeeding time period of said PWM time period.

6. A motor drive apparatus according to claim 5, wherein
each of said first switch, said second switch, said third switch, and said fourth switch includes an MOS transistor; and
said PWM signals generated from said energizing pulse generating unit are supplied to gates of the respective MOS transistors to control the turning ON/OFF of said first switch, said second switch, said third switch, and said fourth switch.

7. A motor drive apparatus according to claim 2, wherein
when said motor is located at a predetermined phase, said energizing pulse generating unit generates PWM signals used to:
turn ON said first switch;
turn OFF said second switch;
turn OFF said third switch; and
turn ON said fourth switch in said preceding time period of said PWM time period; whereas
said energizing pulse generating unit generates PWM signals used to:
turn ON said first switch;
turn OFF said second switch;
turn ON said third switch; and
turn OFF said fourth switch in said succeeding time period of said PWM time period; and
when said motor is moved to another phase, said energizing pulse generating unit generates PWM signals used to:
turn OFF said first switch;
turn ON said second switch;
turn ON said third switch; and
turn OFF said fourth switch in said preceding time period of said PWM time period; whereas
said energizing pulse generating unit generates PWM signals used to:
turn ON said first switch;
turn OFF said second switch;
turn ON said third switch; and
turn OFF said fourth switch in said succeeding time period of said PWM time period.

8. A motor drive apparatus according to claim 7, wherein
each of said first switch, said second switch, said third switch, and said fourth switch includes an MOS transistor; and
said PWM signals generated from said energizing pulse generating unit are supplied to gates of the respective MOS transistors to control the turning ON/OFF of said first switch, said second switch, said third switch, and said fourth switch.

9. A motor drive apparatus for changing a duty factor of a PWM (pulse width modulation) time period to vary a rotating speed of a motor, wherein said motor comprises a 3-phase motor, said motor drive apparatus comprising:
a switch unit including a switch, for controlling a current flowing through said 3-phase motor by opening/closing said switch; and
an energizing pulse generating unit for generating PWM signals used to control said switch unit such that the following power supplying operations are repeatedly carried out:
a power supplying operation from a third input terminal of said 3-phase motor to a first input terminal thereof;
a power supplying operation from a second input terminal of said 3-phase motor to said first input terminal thereof;
a power supplying operation from said second input terminal of said 3-phase motor to said third input terminal thereof;
a power supplying operation from said first input terminal of said 3-phase motor to said third input terminal thereof;
a power supplying operation from said first input terminal of said 3-phase motor to said second input terminal thereof; and
a power supplying operation from said third input terminal of said 3-phase motor to said second input terminal thereof;
wherein:
in a preceding time period of said PWM time period when each of the power supplying operations is performed, a drive current flows from a power supply via said 3-phase motor to a ground point; and
in a succeeding time period of said PWM time period, a regenerative current flows along a direction opposite to that of said drive current.

10. A motor drive apparatus according to claim 9, wherein said switch unit includes:
a first switch, one terminal of which is connected to the power supply, and the other terminal of which is connected to a first input terminal of said 3-phase motor;
a second switch, one terminal of which is connected to said first input terminal of the 3-phase motor, and the other terminal of which is grounded;
a third switch, one terminal of which is connected to said power supply, and the other terminal of which is connected to a second input terminal of said 3-phase motor;
a fourth switch, one terminal of which is connected to said second input terminal of the 3-phase motor, and the other terminal of which is grounded;

a fifth switch, one terminal of which is connected to said power supply, and the other terminal of which is connected to a third input terminal of said 3-phase motor; and a sixth switch, one terminal of which is connected to said third input terminal of the 3-phase motor, and the other terminal of which is grounded.

11. A motor drive apparatus according to claim 10, wherein each of said first switch, said third switch, and said fifth switch includes a PMOS transistor;

each of said second switch, said fourth switch, and said sixth switch includes an NMOS transistor; and said PWM signal generated from said energizing pulse generating unit is supplied to a gate of each of said PMOS transistors to control the turning ON/OFF of said first switch, said third switch, and said fifth switch; and is supplied to a gate of each of said NMOS transistors to control the turning ON/OFF of said second switch, said fourth switch, and said sixth switch.

12. A motor drive apparatus according to claim 11, further comprising:

delay means for delaying the respective PWM signals generated from said energizing pulse generating unit such that said first switch and said second switch are not simultaneously turned ON, said third switch and said fourth switch are not simultaneously turned ON, and said fifth switch and said sixth switch are not simultaneously turned ON; and said PWM signals delayed by said delay means are supplied to the gates of the respective PMOS transistors which constitute said first switch, said third switch, and said fifth switch, and are supplied to the gates of the respective NMOS transistors which constitute said second switch, said fourth switch, and said sixth switch.

13. A motor drive apparatus according to claim 10, wherein when the power supplying operation from the third input terminal of said 3-phase motor to the first input terminal thereof is carried out, said energizing plus generating unit generates PWM signals used to:
turn OFF said first switch;
turn ON said second switch;
turn OFF said third switch;
turn OFF said fourth switch;
turn ON said fifth switch; and
turn OFF said sixth switch in said preceding time period of said PWM time period; whereas said energizing pulse generating unit generates PWM signals used to:
turn ON said first switch;
turn OFF said second switch;
turn OFF said third switch;
turn OFF said fourth switch;
turn ON said fifth switch; and
turn OFF said sixth switch in said succeeding time period of said PWM time period;

when the power supplying operation from said second input terminal of said 3-phase motor to said first input terminal thereof is carried out, said energizing pulse generating unit generates PWM signals used to:
turn OFF said first switch;
turn ON said second switch;
turn ON said third switch;
turn OFF said fourth switch;
turn OFF said fifth switch; and
turn OFF said sixth switch in said preceding time period of said PWM time period; whereas said energizing pulse generating unit generates PWM signals used to:
turn ON said first switch;
turn OFF said second switch;
turn ON said third switch;
turn OFF said fourth switch;
turn OFF said fifth switch; and
turn OFF said sixth switch in said succeeding time period of said PWM time period;

when the power supplying operation from said second input terminal of said 3-phase motor to said third input terminal thereof is carried out, said energizing pulse generating unit generates PWM signals used to:
turn OFF said first switch;
turn OFF said second switch;
turn ON said third switch;
turn OFF said fourth switch;
turn OFF said fifth switch; and
turn ON said sixth switch in said preceding time period of said PWM time period; whereas said energizing pulse generating unit generates PWM signals used to:
turn OFF said first switch;
turn OFF said second switch;
turn ON said third switch;
turn OFF said fourth switch;
turn ON said fifth switch; and
turn OFF said sixth switch in said succeeding time period of said PWM time period;

when the power supplying operation from said first input terminal of said 3-phase motor to said third input terminal is carried out, said energizing pulse generating unit generates PWM signals used to:
turn ON said first switch;
turn OFF said second switch;
turn OFF said third switch;
turn OFF said fourth switch;
turn OFF said fifth switch; and
turn ON said sixth switch in said preceding time period of said PWM time period; whereas said energizing pulse generating unit generates PWM signals used to:
turn ON said first switch;
turn OFF said second switch;
turn OFF said third switch;
turn OFF said fourth switch;
turn ON said fifth switch; and
turn OFF said sixth switch in said succeeding time period of said PWM time period;

when the power supplying operation from said first input terminal of said 3-phase motor to said second input terminal is carried out, said energizing pulse generating unit generates PWM signals used to:
turn ON said first switch;
turn OFF said second switch;
turn OFF said third switch;
turn ON said fourth switch;
turn OFF said fifth switch; and
turn OFF said sixth switch in said preceding time period of said PWM time period; whereas said energizing pulse generating unit generates PWM signals used to:
turn ON said first switch;

turn OFF said second switch;
turn ON said third switch;
turn OFF said fourth switch;
turn OFF said fifth switch; and
turn OFF said sixth switch in said succeeding time period of said PWM time period; and when the power supplying operation from said third input terminal of said 3-phase motor to said second input terminal is carried out, said energizing pulse generating unit generates PWM signals used to:
turn OFF said first switch;
turn OFF said second switch;
turn OFF said third switch;
turn ON said fourth switch;
turn ON said fifth switch; and
turn OFF said sixth switch in said preceding time period of said PWM time period; whereas said energizing pulse generating unit generates PWM signals used to:
turn OFF said first switch;
turn OFF said second switch;
turn ON said third switch;
turn OFF said fourth switch;
turn ON said fifth switch; and
turn OFF said sixth switch in said succeeding time period of said PWM time period.

14. A motor drive apparatus according to claim 13, wherein
each of said first switch, said third switch, and said fifth switch includes a PMOS transistor;
each of said second switch, said fourth switch, and said sixth switch includes an NMOS transistor; and
said PWM signal generated from said energizing pulse generating unit is supplied to a gate of each of said PMOS transistors to control the turning ON/OFF of said first switch, said third switch, and said fifth switch; and is supplied to a gate of each of said NMOS transistors to control the turning ON/OFF of said second switch, said fourth switch, and said sixth switch.

15. A motor drive apparatus according to claim 14, further comprising:
delay means for delaying the respective PWM signals generated from said energizing pulse generating unit such that said first switch and said second switch are not simultaneously turned ON, said third switch and said fourth switch are not simultaneously turned ON, and said fifth switch and said sixth switch are not simultaneously turned ON; and
said PWM signals delayed by said delay means are supplied to the gates of the respective PMOS transistors which constitute said first switch, said third switch, and said fifth switch, and are supplied to the gates of the respective NMOS transistors which constitute said second switch, said fourth switch, and said sixth switch.

16. A motor driving method for changing a duty factor of a PWM (pulse width modulation) time period to vary a rotating speed of a motor, comprising:
causing a drive current to flow from a power supply via said motor to a ground point in a preceding time period of said PWM time period; and
causing a regenerative current to flow along a direction opposite to that of said drive current in a succeeding time period of said PWM time period.

17. A motor driving method according to claim 16, wherein said duty factor of the PWM time period is changed by controlling a switching operation of a switch unit includes:
a first switch, one terminal of which is connected to the power supply, and the other terminal of which is connected to a first input terminal of said motor;
a second switch, one terminal of which is connected to said first input terminal of the motor, and the other terminal of which is grounded;
a third switch, one terminal of which is connected to said power supply, and the other terminal of which is connected to a second input terminal of said motor; and
a fourth switch, one terminal of which is connected to said second input terminal of the motor, and the other terminal of which is grounded; and when said motor is located at a predetermined phase, said motor driving method:
turning ON said first switch;
turning OFF said second switch;
turning OFF said third switch; and
turning ON said fourth switch in said preceding time period of said PWM time period to flow said drive current; whereas
turning ON said first switch;
turning OFF said second switch;
turning ON said third switch; and
turning OFF said fourth switch in said succeeding time period of said PWM time period to flow said regenerative current; and when said motor is moved to another phase, said motor driving method:
turning OFF said first switch;
turning ON said second switch;
turning ON said third switch; and
turning OFF said fourth switch in said preceding time period of said PWM time period to flow said drive current; whereas
turning ON said first switch;
turning OFF said second switch;
turning ON said third switch; and
turning OFF said fourth switch in said succeeding time period of said PWM time period to drive said regenerative current.

18. A motor driving method according to claim 17, wherein
said motor comprises a 3-phase motor; and
the following power supplying operations are repeatedly carried out:
a power supplying operation from a third input terminal of said 3-phase motor to a first input terminal thereof;
a power supplying operation from a second input terminal of said 3-phase motor to said first input terminal thereof;
a power supplying operation from said second input terminal of said 3-phase motor to said third input terminal thereof;
a power supplying operation from said first input terminal of said 3-phase motor to said third input terminal thereof;
a power supplying operation from said first input terminal of said 3-phase motor to said second input terminal thereof; and
a power supplying operation from said third input terminal of said 3-phase motor to said second input terminal thereof;

in a preceding time period of said PWM time period when each of the power supplying operations is performed, a drive current is caused to flow from a power supply via said 3-phase motor to a ground point; and in a succeeding time period of said PWM time period, a regenerative current is caused to flow along a direction opposite to that of said drive current.

19. A motor driving method according to claim 10, wherein said duty factor of the PWM time period is changed by controlling a switching operation of a switch unit includes:

a first switch, one terminal of which is connected to the power supply, and the other terminal of which is connected to a first input terminal of said 3-phase motor;

a second switch, one terminal of which is connected to said first input terminal of the 3-phase motor, and the other terminal of which is grounded;

a third switch, one terminal of which is connected to said power supply, and the other terminal of which is connected to a second input terminal of said 3-phase motor;

a fourth switch, one terminal of which is connected to said second input terminal of the 3-phase motor, and the other terminal of which is grounded;

a fifth switch, one terminal of which is connected to said power supply, and the other terminal of which is connected to a third input terminal of said 3-phase motor; and a sixth switch, one terminal of which is connected to said third input terminal of the 3-phase motor, and the other terminal of which is grounded;

when the power supplying operation from the third input terminal of said 3-phase motor to the first input terminal thereof is carried out, said motor driving method:

turning OFF said first switch;
turning ON said second switch;
turning OFF said third switch;
turning OFF said fourth switch;
turning ON said fifth switch; and
turning OFF said sixth switch in said preceding time period of said PWM time period to flow said drive current; whereas
turning ON said first switch;
turning OFF said second switch;
turning OFF said third switch;
turning OFF said fourth switch;
turning ON said fifth switch; and
turning OFF said sixth switch in said succeeding time period of said PWM time period to flow said regenerative current;

when the power supplying operation from said second input terminal of said 3-phase motor to said first input terminal thereof is carried out, said motor driving method:

turning OFF said first switch;
turning ON said second switch;
turning ON said third switch;
turning OFF said fourth switch;
turning OFF said fifth switch; and
turning OFF said sixth switch in said preceding time period of said PWM time period to flow said drive current; whereas
turning ON said first switch;
turning OFF said second switch;

turning ON said third switch;
turning OFF said fourth switch;
turning OFF said fifth switch; and
turning OFF said sixth switch in said succeeding time period of said PWM time period to flow said regenerative current;

when the power supplying operation from said second Input terminal of said d 3-phase motor t o said third input terminal is carried out; said motor driving method:

turning OFF said first switch;
turning OFF said second switch;
turning ON said third switch;
turning OFF said fourth switch;
turning OFF said fifth switch; and
turning ON said sixth switch in said preceding time period of said PWM time period to flow said drive current; whereas
turning OFF said first switch;
turning OFF said second switch;
turning ON said third switch;
turning OFF said fourth switch;
turning ON said fifth switch; and
turning OFF said sixth switch in said succeeding time period of said PWM time period to flow said regenerative current;

when the power supplying operation from said first input terminal of said 3-phase motor to said third input terminal is carried out, said motor driving method:

turning ON said first switch;
turning OFF said second switch;
turning OFF said third switch;
turning OFF said fourth switch;
turning OFF said fifth switch; and
turning ON said sixth switch in said preceding time period of said PWM time period to flow said drive current; whereas
turning ON said first switch;
turning OFF said second switch;
turning OFF said third switch;
turning OFF said fourth switch;
turning ON said fifth switch; and
turning OFF said sixth switch in said succeeding time period of said PWM time period to flow said regenerative current;

when the power supplying operation from said first input terminal of said 3-phase motor to said second input terminal is carried out, said motor driving method:

turning ON said first switch;
turning OFF said second switch;
turning OFF said third switch;
turning ON said fourth switch;
turning OFF said fifth switch; and
turning OFF said sixth switch in said preceding time period of said PWM time period to flow said drive current; whereas
turning ON said first switch;
turning OFF said second switch;
turning ON said third switch;
turning OFF said fourth switch;
turning OFF said fifth switch; and
turning OFF said sixth switch in said succeeding time period of said PWM time period to flow said regenerative current; and when the power supplying operation from said third input terminal of said 3-phase motor to said second input terminal is carried out, said motor driving method:

turning OFF said first switch;
turning OFF said second switch;
turning OFF said third switch;
turning ON said fourth switch;
turning ON said fifth switch; and
turning OFF said sixth switch in said preceding time period of said PWM time period to flow said drive current; whereas
turning OFF said first switch;
turning OFF said second switch;
turning ON said third switch;
turning OFF said fourth switch;
turning ON said fifth switch; and
turning OFF said sixth switch in said succeeding time period of said PWM time period to flow said regenerative current.

* * * * *